Dec. 22, 1936.   A. R. GABRIEL   2,064,826
ARTICLE OF DECORATION
Filed Jan. 8, 1936   2 Sheets-Sheet 1
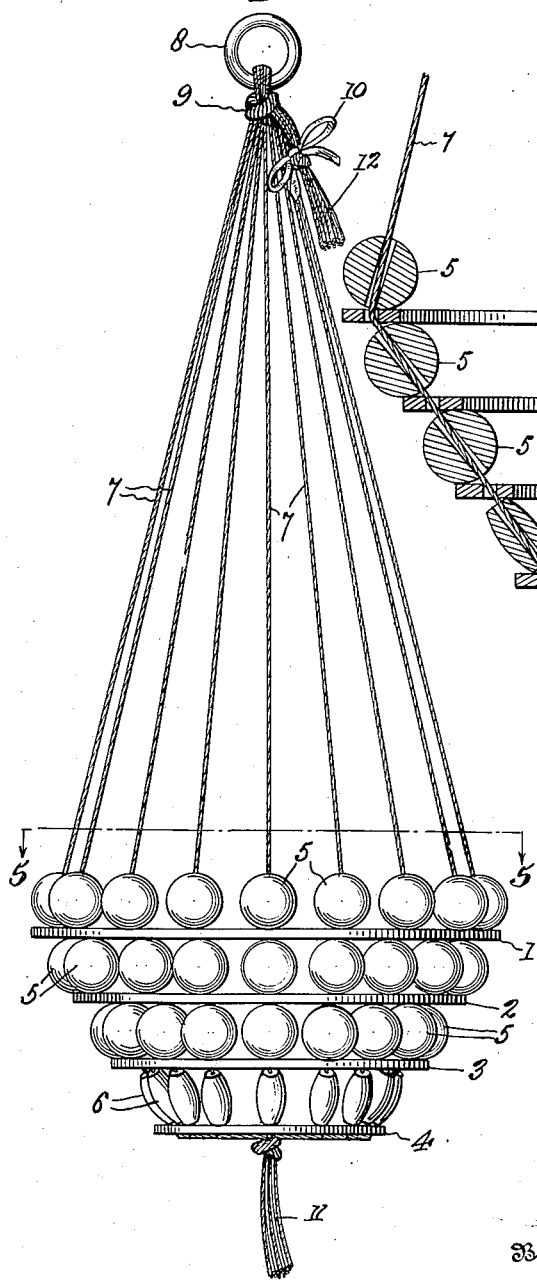
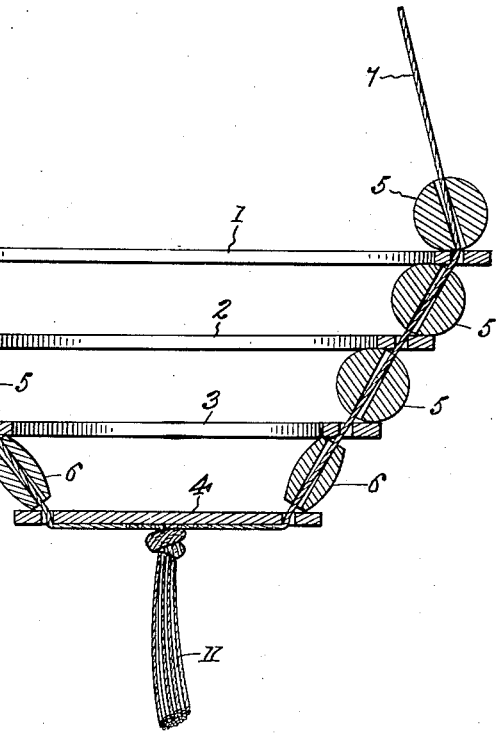
Inventor
ARTHUR R. GABRIEL
By C. P. Goepel.
Attorney Dec. 22, 1936.     A. R. GABRIEL     2,064,826
ARTICLE OF DECORATION
Filed Jan. 8, 1936     2 Sheets-Sheet 2

Inventor
ARTHUR R. GABRIEL

Patented Dec. 22, 1936

2,064,826

UNITED STATES PATENT OFFICE 2,064,826

ARTICLE OF DECORATION

Arthur R. Gabriel, New Rochelle, N. Y., assignor to Saml. Gabriel Sons & Company, New York, N. Y., a corporation of New York Application January 8, 1936, Serial No. 58,030

9 Claims. (Cl. 41—10)

The present invention relates to an article of decoration, and more particularly to a basket like structure of this kind.

One object of the present invention is to provide a basket decoration which may be used for plants, flowers, fruits or as a housing for a source of illumination such as electric light bulbs, or for any other suitable use.

Another object of the invention is to provide an article of decoration having a plurality of members disposed one above another with spacing means between them on strands of wire or cord.

Another object of the invention is to provide an article of decoration that is simple in construction and economical in manufacture.

Another object of the invention is to provide an article of decoration in which the members are adapted to be nested within each other when not in use thereby allowing it to be reduced to a compact mass so it will occupy a small amount of space and may be easily placed in a box for shipping or storage purposes.

Another object of the invention is to provide an article of decoration which is susceptible of various decorative color combinations.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation of the decorative basket in hanging or suspended position.

Figure 2 is an enlarged sectional view taken centrally and vertically through the basket on the line 2—2 of Figure 5.

Figure 3 is a detail perspective view of one of the spacing members.

Figure 4 is a detail perspective view of another form of spacing member used at the bottom of the basket.

Figure 5:
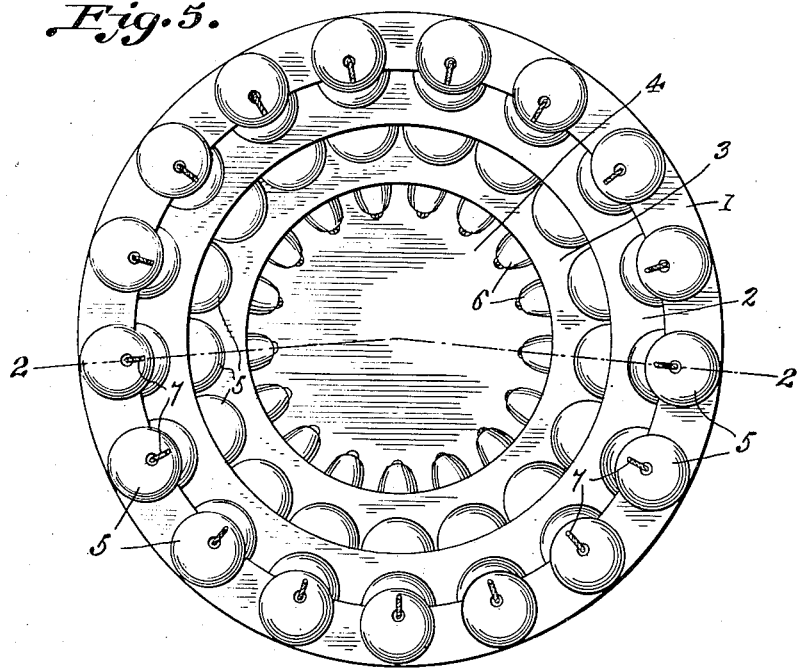
Figure 5 is a horizontal sectional view taken along lines 5—5 of Figure 1, looking down into the basket.
Figure 6:
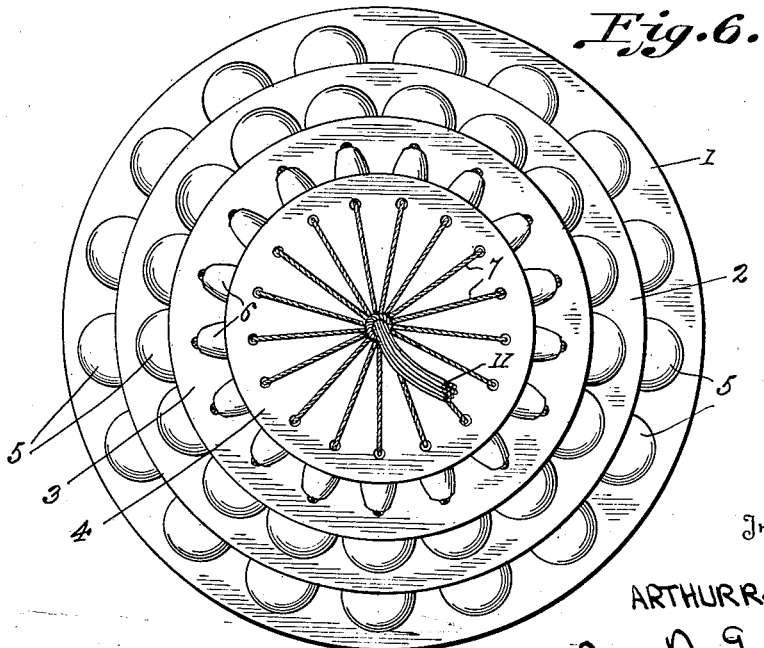
Figure 6 is a bottom plan view of the device.

Referring now more particularly to the drawings, the device is composed of spaced ring-like members 1, 2 and 3 and a bottom disc member 4. The disc 4 may be of solid configuration in contrast to the remaining members, to provide the bottom of the device. All of the aforementioned members may be made of any suitable material, size, detail configuration, and color, but cardboard is preferred because of its economy, light weight and facility in handling and assembling. Suitable spaced apertures are provided around the peripheral edge portions of the members, all of the said apertures being in registry with one another when the members 1, 2, 3 and 4 are placed in superimposed position in the basket structure. The body members 1, 2, 3 and 4 gradually increase in exterior diameter from the bottom disc 4 to the top ring 1 to give a general conical or bulbous appearance to the basket body. The internal diameter of the flat rings 1, 2 and 3 also consecutively increase in diameter from the bottom ring 3 upward, and this may be accomplished by having all of the rings of the same transverse width. The marginal edges of the rings are shown smooth but any other configuration may be had.

The rings 1, 2 and 3 may be increased or decreased in number to suit the size of the basket desired, and the diameters or sizes of the rings, both internally and externally may be varied to adapt the body structure to suitable designs and for holding articles or decorations therein. In order to space the rings or members 1, 2, 3 and 4 apart, spacing means 5 and 6 are provided. These may be buttons, beads or any other type of spacer or sleeve and may be of any color and design. Suitable apertures are likewise provided in these spacers which are adapted to register with the openings in the members 1, 2, 3 and 4 in the assembled structure. After a desired number of rings or members 1, 2 and 3, a bottom disc 4 and spacing members 5 and 6 are selected, they are connected together by strands 7 of cord, tinsel, wire or any other type of stringing or threading means.

In assembling the device shown in the drawings a plurality of strands 7 are knotted or otherwise secured together at their lower end portions and may provide a tassel 11. The free or upper portions of the strands 7 are threaded through a corresponding number of apertures in the bottom disc 4 and said disc is held on the lower ends of the strands 7 by the tassel 11 which engages against the bottom side of the disc 4. The lower spacers 6, which are preferably narrow or of head form as shown in Figure 4, are threaded on the strands 7 against the upper surface of the disc 4. The lower ring 3 is now threaded on the strands 7 and is spaced from the bottom disc 4 by the heads 6. The spacing balls 5, shown in detail in Figure 3, and the upper rings 2 and 1 are now threaded in alternate order on the strands 7 to build up the body portion of the basket, and the apertures through the various elements and the strands 7 are of sufficient number and are so spaced apart as to provide the desired spaces in the side wall of the basket body. After the body portion of the basket has thus been built up, the upper ends of the strands 7 may be brought together through a ring 8 and secured thereto by a knot 9 or other suitable means, and the upper extremities of the strands may provide a second tassel 12 including a bow-knot 10 or the like to impart a decorative finish to the ornament. The basket ornament may be suspended by the ring 8 in any suitable place and may hold flowers, plants, fruit or any desired articles or the like, and the various parts may be of contrasting colors to produce an artistic and attractive article. The spacers 5, and 6 may be of wood or other suitable material and may be given various shapes to blend with the particular configuration desired.

The elements of the article may be vended in knocked-down or assembled condition and the assembling of the parts is readily done. The device may be easily and economically handled.

It is obvious that various changes and modifications may be made in the details of construction and design of the above specifically described embodiment of this invention without departing from the spirit thereof, such changes and modifications being restricted only by the scope of the following claims.

What is claimed is:

1. An article of decoration comprising a plurality of superimposed members having a relatively large central opening and a plurality of spaced apart apertures outwardly of said central opening, spacing means between said members and connecting means threaded through the members and spacers extending through said apertures.

2. An article of decoration comprising a plurality of superimposed members of increasing diameters having a relatively large central opening and a plurality of spaced apart apertures outwardly of said central opening, spacing means between said members, and connecting means for said members and spacers extending through said apertures.

3. An article of decoration comprising a plurality of superimposed circular members, circumferentially spaced apart spacing means between said members, and connecting means for said members and spacers, said connecting means extending upwardly of said members and constituting a supporting means for said members.

4. An article of decoration comprising a plurality of superimposed annular members having circumferentially spaced apart apertures therethrough, spacing means between the members and having apertures therethrough in registry with the apertures of the superimposed members, and connecting means extending through the apertures of the superimposed members and spacing members for uniting said elements together, said connecting means extending upwardly of said members and constituting a supporting means for said members.

5. An article of decoration comprising a plurality of superimposed annular members having circumferentially spaced apart openings therethrough and providing a body portion, spacing means between said members, and connecting means for said members and spacing means, said connecting means extending above and below the spaced superimposed members and secured together to hold the connecting means in place.

6. A basket comprising a plurality of superimposed rings and a base member, elongated spacing means between said base member and a ring member, spacing means between said ring members, connecting means connecting said rings and base member with said spacing means, said connecting means being knotted together below and above said elements.

7. An ornamental basket, comprising a bottom disc, a plurality of spaced rings above the disc consecutively increasing in diameter, spacers between the disc and the adjacent ring and between succeeding rings, and flexible strands threaded through the disc spacers and rings to hold the same in assembled position.

8. An ornamental basket, comprising a bottom disc, a plurality of spaced rings above the disc, spacers between the disc and the adjacent ring and between succeeding rings, and flexible strands threaded through the disc, the rings and the spacers and having their opposite ends secured together to hold the structure together when suspended.

9. An ornamental basket, comprising a bottom disc, a plurality of flat rings above the disc, spacers disposed between the disc and the adjacent ring and between succeeding rings, flexible strands threaded through the disc, the spacers and the rings and having their lower ends knotted together to hold the same from pulling through the elements and providing an ornamental tassel at the bottom of the basket, and a suspension ring secured to the upper ends of the strands to support the same in suspended position and hold the basket to shape.

ARTHUR R. GABRIEL.